Patented Apr. 26, 1949

2,468,436

UNITED STATES PATENT OFFICE 2,468,436

METHOD OF PRODUCING CARBOXYLIC ALIPHATIC NITRILES

J. D. Fitzpatrick and Latimer D. Myers, Cincinnati, Ohio, assignors to Emery Industries, Inc., Cincinnati, Ohio, a corporation of Ohio No Drawing. Application October 24, 1944, Serial No. 560,198

6 Claims. (Cl. 260—465.4)

This invention relates to a method of producing carboxylic aliphatic nitriles, that is, aliphatic chains having the carboxylic acid group on one end and the nitrile group on the other end. The invention resides in the determination that, when unsaturated aliphatic nitriles are destructively oxidized, the nitrile group is undisturbed by the drastic treatment but the oxygen preferentially attacks the aliphatic chain at the multiple bond and splits it, thus producing shorter chain carboxylic aliphatic acids and the acid aliphatic nitriles. The preferred starting material is an unsaturated fatty material, such as an unsaturated glyceride or fatty acid; olive oil and oleic acid are exemplary but any others obtainable in nature or synthetically may be employed.

The unsaturated glycerides or acids are first converted into corresponding nitriles by any of the well-known methods.

The nitrile so produced is then oxidized by a powerful re-agent capable of splitting the aliphatic chain at the point of unsaturation, but not adapted to attack the nitrile group, at least under the conditions under which the re-agent is used. The technique of oxidizing these unsaturated fatty bodies and the oxidizing solution suitable for carrying out the process is disclosed in our co-pending application Serial No. 518,992, filed January 20, 1944, now abandoned. Other oxidizing agents may be employed, but the process disclosed in the application is recommended inasmuch as it has been found to provide very excellent yields.

It has not been previously recognized that nitriles were inert to oxidizing agents of sufficient potency to disrupt unsaturated aliphatic compounds. The recognition of this fact and its application to the production of acid nitriles is the substance of the present invention.

In the past, attempts to manufacture these acid nitriles from dibasic acids have been made. It is possible to make a nitrile from any fatty acid, but the problem of manufacturing what may be called a half nitrile from a dibasic acid is very difficult because the nitrile producing reaction cannot be controlled to affect one and only one acid group in each molecule of dibasic acid. It is the tendency of the nitrile forming reaction to produce a mixture of double nitrile and half nitrile, or double nitrile, half nitrile and free dibasic acid.

The present invention is an improvement over the methods previously proposed in the art in that the nitrile is formed when there is but one point in the molecule at which the nitrile reaction may take place and the acid group of the final product is constituted after the formation of the nitrile group has been completed.

For example, oleic nitrile can be made by any one of the well-known methods, for instance, by converting aliphatic acid into the methyl ester by simple esterification, then passing the methyl oleate with ammonia gas over aluminum oxide at a temperature of 490–500° C. This method is described in Bulletin de la societe chimique de France, 27, 226–9 (1920). This nitrile contains 0.4 per cent of free fatty acid and has an iodine value of 95.7. Five hundred (500) parts of this oleic nitrile are oxidized with a solution consisting of:

| | Parts |
|---|---|
| Chromic acid | 760 |
| Concentrated sulfuric acid | 1900 |
| Water | 3040 |

In treating the nitrile with the solution the latter is divided into three parts and the nitrile treated with each one separately, the spent solution being drawn off after each treatment. The solution is added to the nitrile slowly with constant mechanical agitation and the temperature is maintained at 80–90° C. to remove traces of chromium salts and then the product is water-washed and dried. At this point the product of oxidation consists of 563 parts of an oily material with an iodine value of 0.5. The oxidized mixture is then extracted repeatedly with petroleum ether which extracts substantially 361.5 parts of material consisting of pelargonic acid, by-product acids and unreacted nitriles, including any saturated nitriles which may have been present in the original oleic nitrile. The ether insoluble residue consists of 201.5 parts of 8-cyano-octanoic acid. This material may be further purified, if desired, by converting it to the barium salt, dissolving it hot in an excess of barium chloride, removing impurities by filtration then reconverting it to an acid by treating it with sulfuric acid.

Another technique of oxidizing such a nitrile is as follows:

Fifty parts of oleic nitrile, prepared as in Example I, are dissolved in 500 parts of acetone, and 220 parts of finely powdered potassium permanganate is added slowly while refluxing on the steam bath. After permanganate addition is complete, the mixture is refluxed for 18 hours on the steam bath, then evaporated to dryness. The dry or acetone-free residue is taken up in water solution and the manganese dioxide precipitate reduced with sodium bisulfite and sulfuric acid in quantity sufficient to cause complete solution of the manganese dioxide. The oily product which separates from the solution is washed and dried. This method produces substantially 47.6 parts of reaction products. This mixture is then separated into petroleum ether soluble and petroleum ether insoluble components as in Example I above. In this way, 34.1 parts of petroleum ether soluble material which contains the monobasic acids, unreacted nitriles, etc., and 12.9 parts of petroleum ether insoluble 8-cyano-octanoic acid or 25.8 per cent of the original oleic nitrile are recovered.

The formula for 8-cyano-octanoic acid is

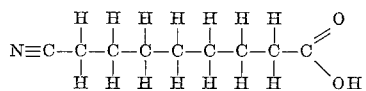

Other re-agents for and methods of oxidizing oleic acid into azelaic and pelargonic acid have been proposed in the art and these too may be utilized for oxidizing the unsaturated aliphatic nitriles to acid nitriles and monobasic carboxylic acids, provided conditions are not such as to cause attack on the nitrile group.

Oleic acid or oleic glycerides are the most available sources of unsaturated aliphatic materials from which to manufacture the nitriles to be oxidized. The process, however, is not limited to the oxidation of oleic nitriles but is susceptible to use on any unsaturated aliphatic nitrile. The fatty glycerides and fatty acids which are less saturated than oleic acid may be used in this process, but obviously the consumption of oxygen is very substantially greater unless such products are first hydrogenated to reduce the unsaturation. Inasmuch as it requires four atoms of oxygen or two atoms of hydrogen to eliminate each bond of unsaturation it is recommended, as a matter of economics, that fatty oils or fatty acids more unsaturated than oleic be reduced prior to being subjected to the oxidizing treatment. Other unsaturated aliphatic acids which may be utilized in this process are as follows: erucic acid or rape seed oil, palmitoleic acid from certain fish oils or isooleic acids either as naturally occurring in nature or produced by synthetic methods.

Having described our invention, we claim:

1. A method of producing carboxylic aliphatic nitriles which consists in treating an unsaturated aliphatic nitrile of a higher fatty acid with an oxidizing agent to cause cleavage at the point of unsaturation to produce acid nitriles, and aliphatic monocarboxylic acids.

2. A method of producing 8-cyano-octanoic acid which comprises treating oleic nitrile with an oxidizing agent to cause cleavage at the double bond.

3. A method of producing 8-cyano-octanoic acid which consists in heating oleic nitrile with an oxidizing solution consisting essentially of chromic acid, water, and sulfuric acid to cleave the double bond.

4. A method of producing 8-cyano-octanoic acid which consists in heating oleic nitrile at a temperature of approximately 80° to 90° C. with an oxidizing solution consisting essentially of 760 parts chromic acid, 1900 parts concentrated sulfuric acid and 3040 parts water, all parts being by weight, for a sufficient time to cause cleavage of the double bond of a substantial portion of the oleic nitrile.

5. A method of producing carboxylic aliphatic nitriles which consists in heating a higher unsaturated aliphatic nitrile with a chromic acid oxidizing solution for a sufficient time to cause cleavage of the double bond of a substantial proportion of the unsaturated aliphatic nitrile.

6. A method of producing carboxylic aliphatic nitriles which consists in heating an unsaturated aliphatic nitrile containing 16 to 22 carbon atoms with a chromic acid oxidizing solution for a sufficient time to cause cleavage of the double bond of a substantial proportion of the unsaturated aliphatic nitrile.

J. D. FITZPATRICK.
LATIMER D. MYERS.

REFERENCES CITED

The following references are of record in the file of this patent:

UNITED STATES PATENTS

| Number | Name | Date |
|---|---|---|
| 2,033,536 | Ralston et al. | Mar. 10, 1936 |
| 2,033,537 | Ralston et al. | Mar. 10, 1936 |
| 2,178,874 | Harvey | Nov. 7, 1939 |
| 2,203,680 | Ellingboe | June 11, 1940 |
| 2,305,103 | Osgood | Dec. 15, 1942 |

OTHER REFERENCES

Murai et al., Chemical Abstracts, vol. 35, 1941, page 462.